United States Patent
Shih

(10) Patent No.: US 9,828,101 B2
(45) Date of Patent: Nov. 28, 2017

(54) ARMREST STRUCTURE AND AIRCRAFT SEAT ASSEBLY THEREOF

(71) Applicant: Aircom Pacific Inc., San Jose, CA (US)

(72) Inventor: Daniel Shih, Dublin, CA (US)

(73) Assignee: Aircom Pacific Inc., San Jose, CA (US)

( * ) Notice: Subject to any disclaimer, the term of this patent is extended or adjusted under 35 U.S.C. 154(b) by 37 days.

(21) Appl. No.: 14/860,730

(22) Filed: Sep. 22, 2015

(65) Prior Publication Data

US 2016/0355265 A1 Dec. 8, 2016

(30) Foreign Application Priority Data

Jun. 4, 2015 (TW) .............................. 104118051 A

(51) Int. Cl.
 *B64D 11/06* (2006.01)
 *B60N 2/46* (2006.01)
(52) U.S. Cl.
 CPC ............ *B64D 11/0644* (2014.12); *B60N 2/46* (2013.01); *B60N 2/4606* (2013.01); *B64D 11/0646* (2014.12)
(58) Field of Classification Search
 CPC .. B64D 11/0644; B64D 11/0646; B60N 2/46; B60N 2/4606; B60N 2/32
 See application file for complete search history.

(56) References Cited

U.S. PATENT DOCUMENTS

| | | | |
|---|---|---|---|
| 2004/0046430 A1* | 3/2004 | Plant .................... | B60N 2/4606 297/248 |
| 2005/0194828 A1* | 9/2005 | Johnson ................... | B60N 2/62 297/411.32 |
| 2009/0008982 A1* | 1/2009 | Langensiepen ........ | B60N 3/102 297/411.32 |
| 2010/0252680 A1* | 10/2010 | Porter ...................... | B60N 2/01 244/118.6 |
| 2015/0165944 A1* | 6/2015 | Almeida .............. | B60N 2/4626 297/411.31 |

* cited by examiner

*Primary Examiner* — Assres H Woldemaryam
(74) *Attorney, Agent, or Firm* — Gokalp Bayramoglu

(57) ABSTRACT

An armrest structure and an aircraft seat assembly thereof are disclosed. The armrest structure includes an armrest body and two support plates. The armrest body is disposed between two aircraft seats. The shape of the support plates correspond to the armrest body and the support plates are disposed at two sides of the armrest body respectively. Each of the support plates has a first position and a second position. The support plates combine with the armrest body to form an armrest when the support plates are at the first position. The support plates and the armrest body are vertical to each other so that a hand of the passenger can rest on the support plates when the support plates are in the second position.

14 Claims, 5 Drawing Sheets

ARMREST STRUCTURE AND AIRCRAFT SEAT ASSEBLY THEREOF

CROSS-REFERENCE TO RELATED APPLICATION

This application claims priority from Taiwan Patent Application No. 104118051, filed on Jun. 4, 2015, in the Taiwan Intellectual Property Office, the content of which are hereby incorporated by reference in their entirety for all purposes.

BACKGROUND OF THE INVENTION

1. Field

The present invention relates to a technical field of seat, and especially relates to an arm structure and an aircraft seat assembly thereof for aircraft and other communications and transportation vehicles.

2. Description of the Related Art

A prior seat arrangement on an aircraft is that a plurality of aircraft seats are set adjacently with each other. For example, window seats are arranged in a group of two seats or three seats set adjacently with each other, and center seats in center region are arranged in a group of four seats, five seats or more set adjacently with each other. In the above-mentioned seat arrangement, passengers seat on each two adjacent aircraft seats may share a common arm, which is set between the two adjacent aircraft seats. Or, arms of the two adjacent aircraft seats are very near, accordingly hands of passengers may touch with each other. The touching problem between passengers is seriously and bothers passengers all the time very much.

Thus, the inventor(s) of the present invention meditate and design an arm structure and an aircraft seat assembly thereof for improving the problems of existing technique and increasing, the industrial applications and embodiments.

SUMMARY OF THE INVENTION

For the foregoing prior art problems, the object of the present invention is to provide an arm structure and an aircraft seat assembly thereof, which can improve the problems resulted from prior art technique.

In accordance with the object of the present invention, an arm structure is provided. The arm structure includes an arm body and a supporting board. The arm body is set between two adjacent aircraft seats. The supporting board is shaped corresponding to the arm body and pivotally connected to two sides of the arm body, wherein the supporting board has a first position and a second position. When the two supporting boards are in the first position, the two supporting boards integrated with the arm body to form an arm. When the two supporting boards are in the second position, the two supporting boards are perpendicular to the arm body, for supporting hands of passengers seated on the two adjacent aircraft seats.

In accordance with the preferred embodiments, the arm body may include two recess portions, wherein the two supporting boards are set within the recess portions.

In accordance with the preferred embodiments, an end of the supporting board and a side of the supporting board near the arm body are pivotally set within the recess portion, and the side of the supporting board is near a seat cushion of the aircraft seat.

In accordance with the preferred embodiments, the supporting hoard can be turned to the seat cushion of the aircraft seat, so that the two supporting hoards can be rotated from the first position into the second position.

In accordance with the preferred embodiments, the arm body may include two recess portions, wherein the two supporting boards are set within the recess portions.

In accordance with the preferred embodiments, the width of the supporting board is less than the width of the arm body, an end of the supporting board and a side of the supporting board near the arm body are pivotally set within the recess portion, and the side of the supporting board is opposite to a seat cushion of the aircraft seat.

In accordance with the preferred embodiments, the supporting board can be turned corresponding to the seat cushion of the aircraft seat, so that the two supporting boards can be rotated from the first position into the second position.

In accordance with the preferred embodiments, an end of the supporting board and a side of the supporting board near the arm body are pivotally set within the recess portion, and the side of the supporting board is opposite to a seat cushion of the aircraft seat.

In accordance with the preferred embodiments, the supporting board can be turned corresponding to the seat cushion of the aircraft seat, so that the two supporting boards can be rotated from the first position into the second position, where the two supporting boards and the arm body are integrated in a reverse T-shape.

In accordance with the object of the present invention, an aircraft seat assembly is further provided. The aircraft seat assembly includes a plurality of aircraft seats and at least one arm structure. The aircraft seats are set adjacently with each other. The arm structure includes an arm body and two supporting boards. The arm body is set between the aircraft seats. The two supporting boards are shaped corresponding to the arm body, and are pivotally connected to two sides of the arm body respectively, wherein each of the two supporting boards has a first position and a second position. When the two supporting boards are in the first position, the two supporting boards integrated with the arm body to form an arm. When the two supporting boards are in the second position, the two supporting boards are perpendicular to the arm body, for supporting hands of passengers seated on the aircraft seats.

In accordance with the preferred embodiments, the arm body may include two recess portions, and the two supporting boards are set within the recess portions.

In accordance with the preferred embodiments, an end of the supporting board and a side of the supporting board near the arm body can be pivotally set within the recess portion, and the side of the supporting board is near a seat cushion of the aircraft seat.

In accordance with the preferred embodiments, the supporting board can be turned to the seat cushion of the aircraft seat, so that the two supporting boards are rotated from the first position into the second position.

In accordance with the preferred embodiments, the width of the supporting board can be less than the width of the arm body, an end of the supporting board and a side of the supporting board near the arm body are pivotally set within the recess portion, and the side of the supporting board is opposite to a seat cushion of the aircraft seat.

In accordance with the preferred embodiments, the supporting board can be turned corresponding to the seat cushion of the aircraft seat, so that the two supporting boards are rotated from the first position into the second position.

In accordance with the preferred embodiments, an end of the supporting board and a side of the supporting board near the arm body are pivotally set within the recess portion, and the side of the supporting board is opposite to a seat cushion of the aircraft seat.

In accordance with the preferred embodiments, the supporting board can be turned corresponding to the seat cushion of the aircraft seat, so that the two supporting boards can be rotated from the first position into the second position, where the two supporting boards and the arm body are integrated in a reverse T-shape.

Regarding the above mentioned arm structure and aircraft seat assembly of the present invention, when the two supporting boards are rotated to the first position, the two supporting boards can be integrated with the arm body to form an arm, so that the outlook appearance of the arm structure is smoothly and not suddenly such that the aesthetic of the arm structure is accordingly improved. Furthermore, when the two supporting boards are in the second position, the two supporting boards are perpendicular to the arm body, for supporting hands of passengers seated on the aircraft seats. Therefore, the hands of the passengers seated on the adjacent aircraft seats can be prevented from touching each other, and the problems bothered the passengers can be resolved.

BRIEF DESCRIPTION OF THE DRAWINGS

Features will become apparent to those of skill in the art by describing in detail exemplary embodiments with reference to the attached drawings in which.

DETAILED DESCRIPTION OF THE PREFERRED EMBODIMENTS

Figure 1:
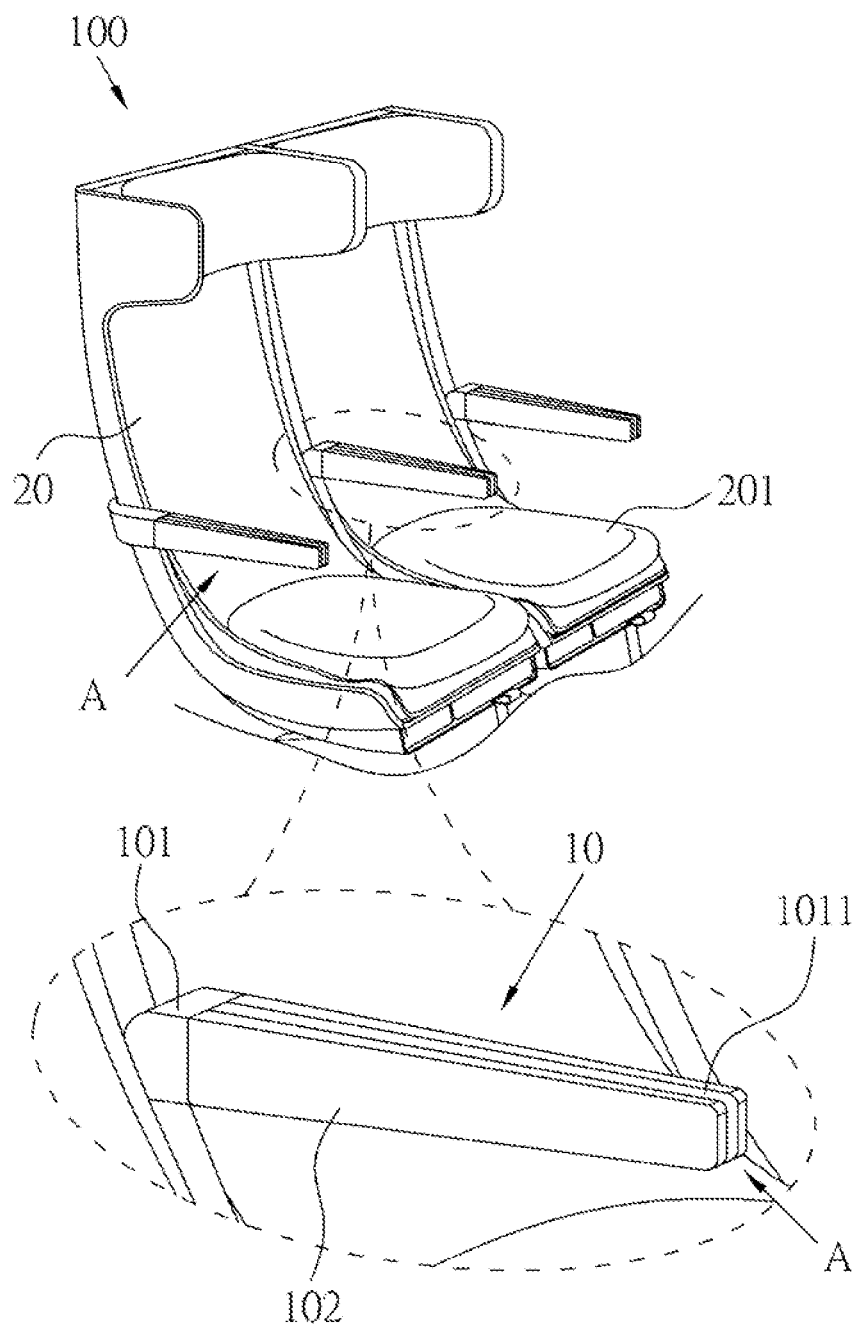
FIG. 1 illustrates a first schematic of a first embodiment of an aircraft seat assembly according to the present invention.

Example embodiments are described more fully hereinafter with reference to the accompanying drawings; however, since the drawings are shown for clearly describing and supporting the specification of the present invention, they may not in real proportional scale or with precise arrangement. Therefore, they may be embodied in different forms and should not be construed as limited to the embodiments set forth herein. Rather, these embodiments are provided so that this disclosure will be thorough and complete, and will fully convey exemplary implementations to those skilled in the art.

Referring to the related drawings, the following description will disclose some example embodiments of an arm structure and an aircraft seat assembly of the present invention. For clarification and understanding, like reference numerals refer to like elements throughout.

Figure 2:
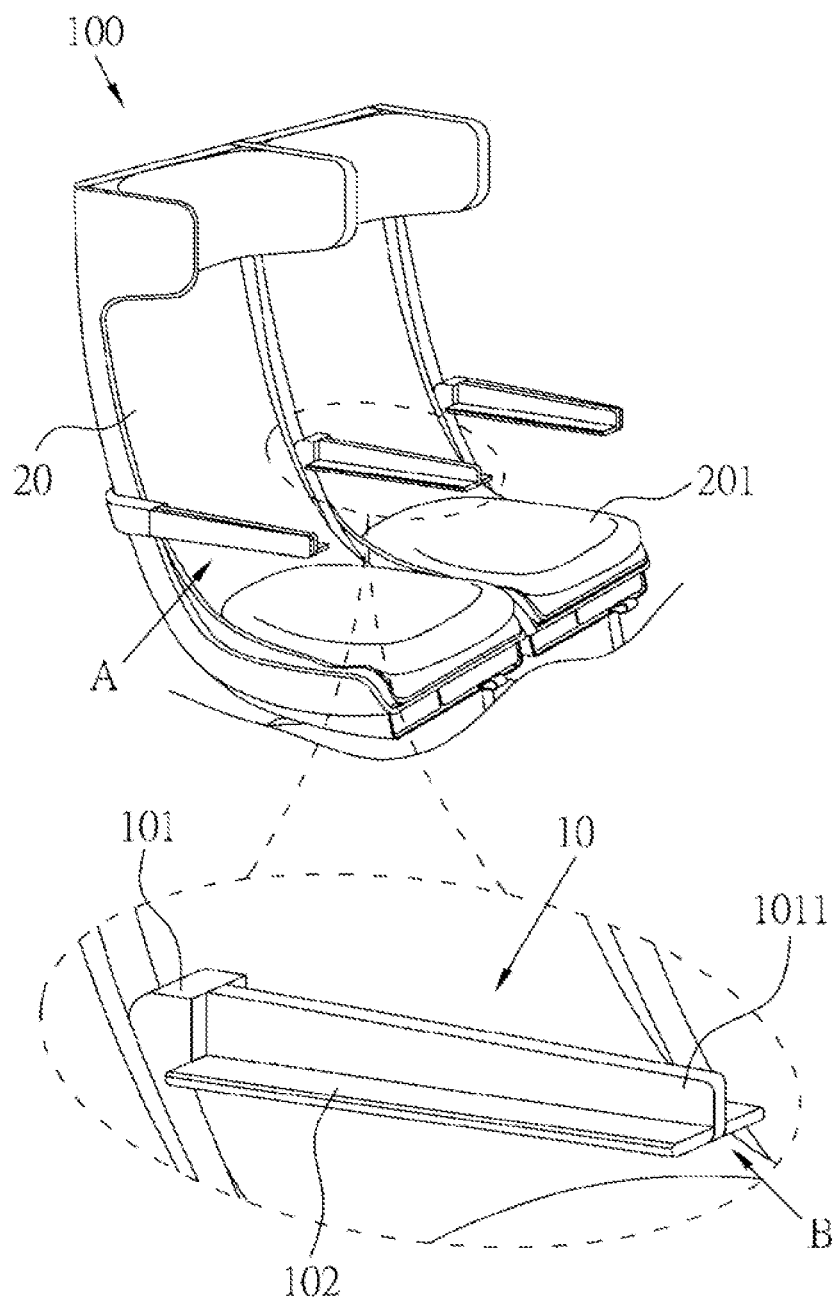
FIG. 2 illustrates a second schematic of the first embodiment of an aircraft seat assembly according to the present invention.

Referring to FIGS. 1 and 2, they illustrate a first schematic and a second schematic of a first embodiment of an aircraft seat assembly according to the present invention. The aircraft seat assembly 100 includes an arm structure 10 of the present invention, which is used for passengers putting their hands appropriately.

As shown in FIGS. 1 and 2, the aircraft seat assembly 100 includes an arm structure 10 and an aircraft seat 20. The amount of the aircraft seat 20 may be two, three or more, and the amount of the arm structure 10 may be corresponding one, two or more. In this embodiment, the present invention uses two aircraft seat 20 and one arm structure 10 as an example. However, it cannot be used for limiting the present invention The two aircraft seats 20 are located adjacently. The arm structure 10 includes an arm body 101 and two supporting boards 102. The arm structure 10 is set between the two adjacent aircraft seats 20. The two supporting boards 102 are shaped corresponding to the arm body 101, and pivotally connected to two sides of the arm body 101 respectively. Each of the two supporting boards 102 has a first position A and a second position B.

As shown in FIG. 1, when the two supporting boards 102 are in the first position A, the two supporting boards 102 are integrated with the arm body 101 harmoniously to form an arm in normal shape. As shown in FIG. 2, when the two supporting boards 102 are in the second position B, the two supporting boards 102 are perpendicular to the arm body, for supporting hands of passengers seated on the two aircraft seats 20.

Furthermore, the arm body 101 is in a T shape from a top view. That is, the arm body 101 includes two recess portions from a top view, wherein the two supporting boards are set within the recess portions. Therefore, when the two supporting boards 102 are in the first position A, the two supporting boards 102 can be filled in the recess portions of the arm body harmoniously, and the two supporting boards 102 can accordingly be integrated with the arm body 101 to form an arm not suddenly.

On the other hand, an end of the supporting board 102 and a side of the supporting board 102 near the arm body 101 are pivotally set within the recess portion 1011, and the side of the supporting board 102 is near seat cushion 201 of the aircraft seat 20. Therefore, the passengers seated on the aircraft seat 20 can turn the supporting board 102 to the direction of the seat cushion 201 of the aircraft seat 20, so that the supporting board 102 is rotated from the first position A into the second position B. Thus, the passengers seated on the aircraft seat 20 can put their hands on the supporting board 102 comfortably.

Figure 3:
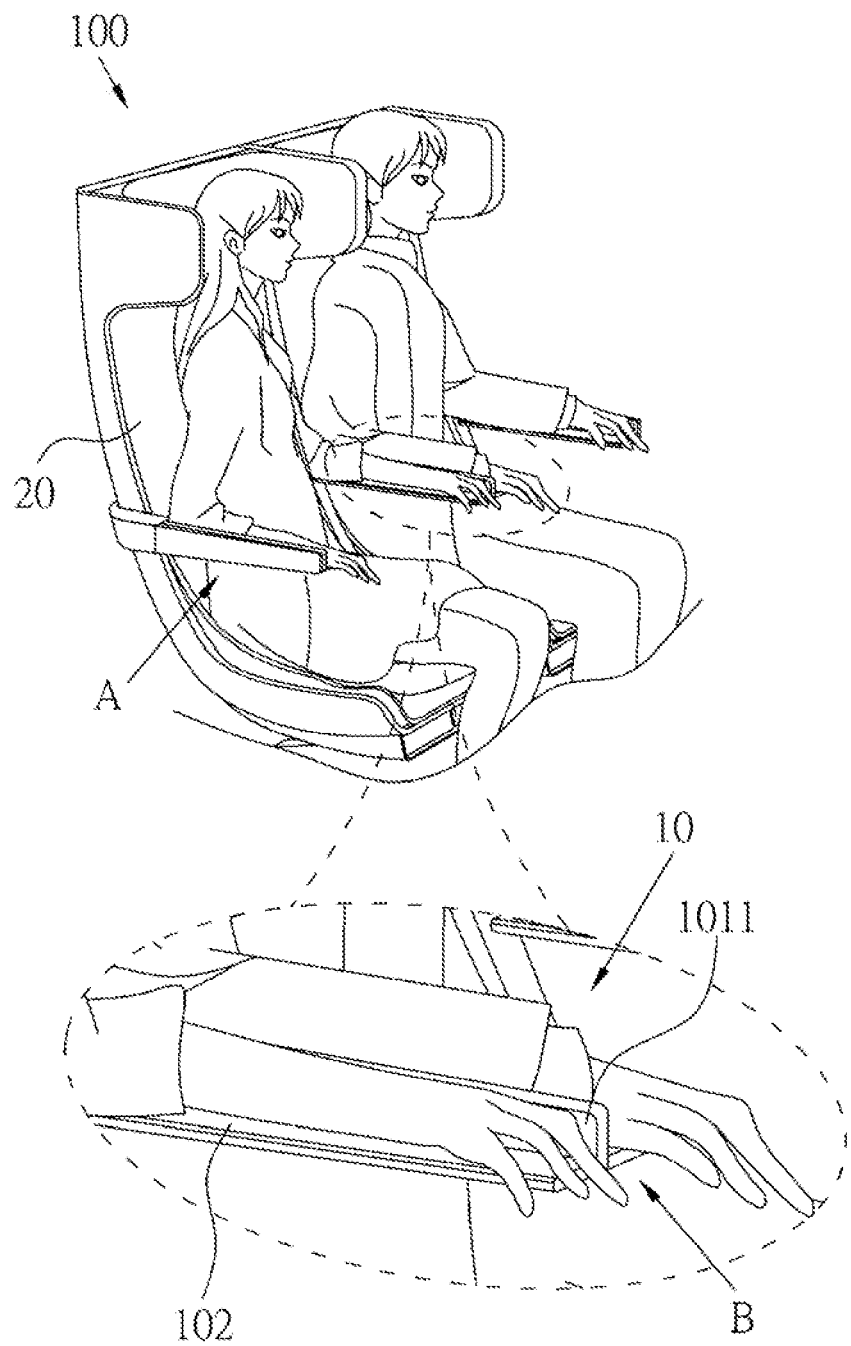
FIG. 3 illustrates a third schematic of the first embodiment of an aircraft seat assembly according to the present invention.

Referring further to FIG. 3, it illustrates a third schematic of the first embodiment of the aircraft seat assembly according to the present invention. As shown in FIG. 3, when the two supporting boards 102 are in the second position B, the two supporting boards 102 and the arm body 101 are integrated in a reverse T-shape from a cross-sectional view at an end of the arm body 101. Therefore, the passengers seated on the aircraft seat 20 and on both sides of the arm structure 10 can put their hands on the supporting board 102 respectively, and the arm body 101 can naturally be a partition board for preventing hands of the passengers from touching each other. By way of the design of the present invention, the problems of un-purposely touching hands which bothered the passengers can be resolved.

By the way, the techniques used for the supporting board 102 pivotally set within the recess portion 1011 can be any ones town by skilled in the art. For example, it can be a method of using a hinge for prior flip electronics devices or using a cylinder lodging in a circular hole. When using the method of a cylinder lodging in a circular hole, it is preferred that an engaging part is used to preventing the supporting board 102 from suddenly or unexpectedly rotating between the first position A and the second position B. The engaging part can work by interference between two parts or engagement. For example, the engaging part, such as a protrusion, can be set on the walls of the recess portion 1011 and a pit is set on the walls of the supporting board 102, so that the supporting board 102 can be engaged in the first position A when the protrusion engages the pit. Or, the engaging part, such as a hook, can be set on the walls of the recess portion 1011 and a groove is set on the walls of the supporting board 102 corresponding to the hook, so that the supporting hoard 102 can be engaged in the first position A when the hook engages the groove.

Figure 4:
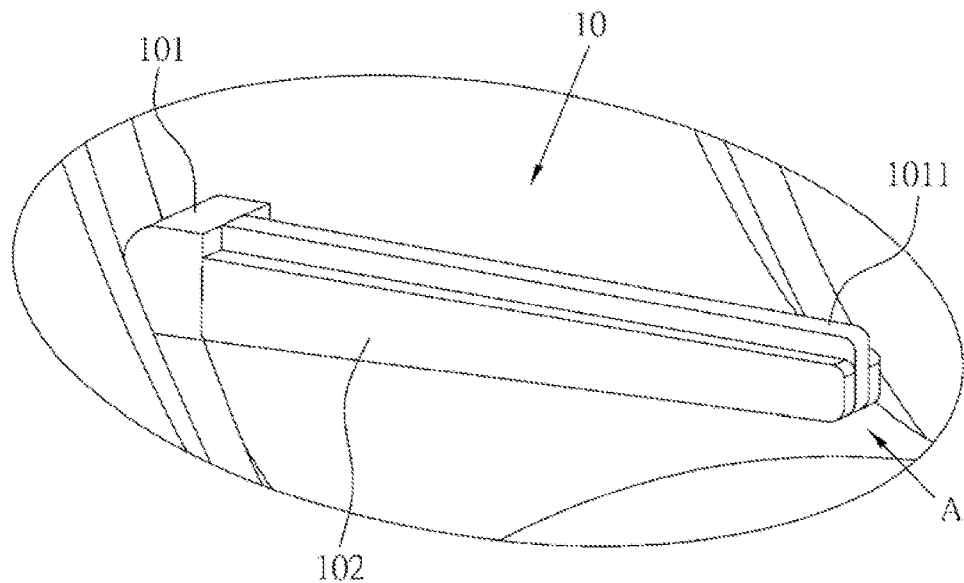
FIG. 4 illustrates a first schematic of a second embodiment of an aircraft seat assembly according to the present invention.
Figure 5:
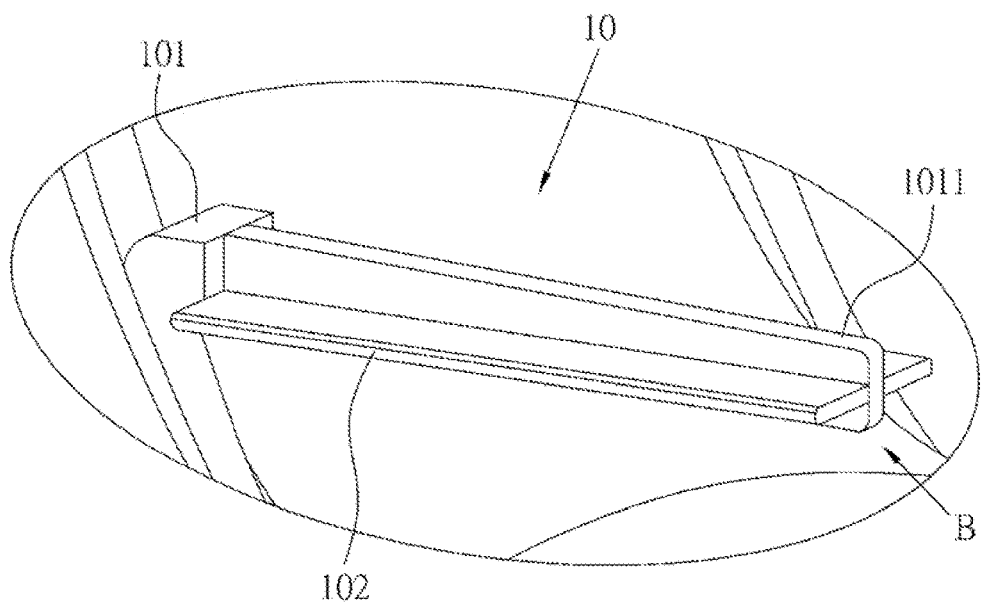
FIG. 5 illustrates a second schematic of the second embodiment of an aircraft seat assembly according to the present invention.

Referring to FIGS. 4 and 5, they illustrate a first schematic and a second schematic of a second embodiment of an aircraft seat assembly according to the present invention. In this embodiment, some components are the same and need not described anymore. The major difference between the second embodiment and the first embodiment is that the supporting board 102 is rotated from the first position A into the second position B.

Further, in accordance with the second embodiment, the width of the supporting board 102 is less than the width of the arm body 101. In addition, an end of the supporting board 102 and a side of the supporting board 102 near the arm body 102 are pivotally set within the recess portion 1011, wherein the side of the supporting board 102 is opposite to the seat cushion 201 of the aircraft seat 20.

Therefore, the passengers seated on the aircraft seat 20 can rotate the supporting board 102 forward or backward with respect to the seat cushion 201 of the aircraft seat 20, so that the supporting board 102 can be rotated between the first position A and the second position B. The two supporting hoards 102 and the arm body 101 are integrated in substantially a reverse T-shape from a cross-sectional view at an end of the arm body 101. The passengers seated on the aircraft seat 20 and on both sides of the arm structure 10 can put their hands on the supporting board 102 respectively, and the arm body 101 can naturally be a partition board for preventing hands of the passengers from touching each other. By way of the design of the present invention, the problems of un-purposely touching hands which bothered the passengers can be resolved.

Figure 6:
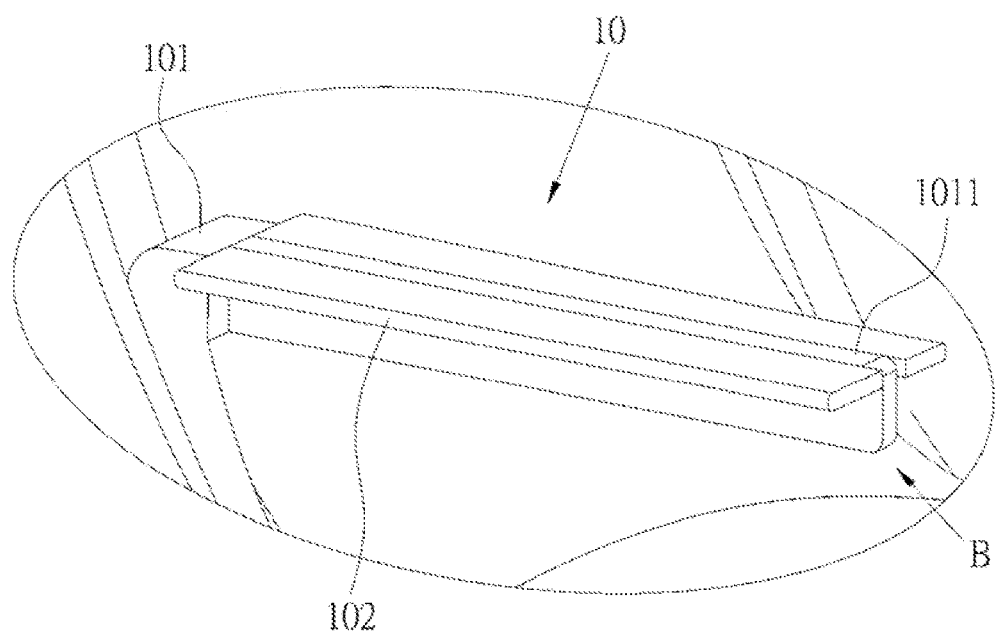
FIG. 6 illustrates a schematic of a third embodiment of an aircraft seat assembly according to the present invention.

Referring to FIG. 6, it illustrates a schematic of a third embodiment of an aircraft seat assembly according to the present invention. In this embodiment, some components are the same and need not described anymore. The major difference between the third embodiment and the first embodiment is that the supporting board 102 is rotated from the first position A into the second position B. And the difference between the third embodiment and the second embodiment is that the two supporting boards 102 and the arm body 101 are integrated in a T-shape from a cross-sectional view at an end of the arm body 101, after the supporting board 102 rotating from the first position A into the second position B.

In this embodiment, the width of the supporting board 102 can correspond to or equal to the width of the arm body 101. In addition, an end of the supporting board 102 and a side of the supporting board 102 near the arm body 101 are pivotally set within the recess portion 1011, and the side of the supporting board 102 is opposite to the seat cushion 201 of the aircraft seat 20.

Therefore, the passengers seated on the aircraft seat 20 can turn the supporting board 102 to or back to the seat cushion 201 of the aircraft seat 20, so that the supporting board 102 can be rotated from the first position A into the second position B. The two supporting boards 102 and the arm body 101 are integrated in substantially a T-shape from a cross-sectional view at an end of the arm body 101. That is, the turned supporting board 102 on the second position B will be on the same plane with the top surface of the arm structure 10. The passengers seated on the aircraft seat 20 and on both sides of the arm structure 10 can put their hands on the supporting board 102 respectively, and the arm body 101 can naturally be a partition board for preventing hands of the passengers from touching each other. By way of the design of the present invention, the problems of un-purposely touching hands which bothered the passengers can be resolved.

Therefore, according to the preferred embodiments of the present invention, there are extra spaces provided outside both sides of the arm structures 10, so that the passengers seated on the aircraft seat 20 and on both sides of the arm structure 10 can put their hands on the supporting board 102 respectively, and the extra spaces can be used for preventing hands of the passengers from touching each other. By way of the design of the present invention, the problems of un-purposely touching hands which bothered the passengers can be resolved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An armrest structure, comprising:
    an arm body set between two adjacent aircraft seats, wherein the arm body is a T-shaped structure from a top view; and
    two supporting boards, shaped corresponding to the arm body, and pivotally connected to two sides of the arm body respectively, each of the two supporting boards having a first position and a second position, when the two supporting boards in the first position, the two supporting boards integrated with the arm body to form an arm, when the two supporting boards in the second position, the two supporting boards perpendicular to the arm body, for supporting hands of passengers seated on both the two aircraft seats, wherein the arm body includes two recess portions to form the T-shaped structure from the top view, and the two supporting boards are set within the recess portions from the top view.

2. The armrest structure as claimed in claim 1, wherein an end of the two supporting boards and a side of the two supporting boards near the arm body are pivotally set within the recess portion, and the side of the two supporting boards is near a seat cushion of the two adjacent aircraft seats.

3. The armrest structure as claimed in claim 2, wherein the two supporting boards are turned to the seat cushion of the two adjacent aircraft seats, so that the two supporting boards are rotated from the first position into the second position.

4. The armrest structure as claimed in claim 1, wherein the widths of the two supporting boards are less than the width of the arm body, an end of the two supporting boards and a side of the two supporting boards near the arm body are pivotally set within the recess portion, and the side of the two supporting boards is opposite to a seat cushion of the two adjacent aircraft seats.

5. The armrest structure as claimed in claim 4, wherein the two supporting boards are turned to the seat cushion of the two adjacent aircraft seats so that the two supporting boards are rotated from the first position into the second position.

6. The armrest structure as claimed in claim 1, wherein an end of the two supporting boards and a side of the two supporting boards near the arm body are pivotally set within the recess portion, and the side of the two supporting boards is opposite to a seat cushion of the two adjacent aircraft seats.

7. The armrest structure as claimed in claim 6, wherein the two supporting boards are turned to the seat cushion of the two adjacent aircraft seats, so that the two supporting boards are rotated from the first position into the second position, where the two supporting boards and the arm body are integrated in a reverse T-shape.

8. An aircraft seat assembly, comprising:
a plurality of aircraft seats set adjacently with each other; and
at least one armrest structure, comprising:
an arm body set between a plurality of aircraft seats, wherein the arm body is a T-shaped structure from a top view; and
two supporting boards, shaped corresponding to the arm body, and pivotally connected to two sides of the arm body respectively, each of the two supporting boards having a first position and a second position, when the two supporting boards in the first position, the two supporting boards integrated with the arm body to form an arm, when the two supporting boards in the second position, the two supporting boards perpendicular to the arm body, for supporting hands of passengers seated on the aircraft seats, wherein the arm body includes two recess portions to form the T-shaped structure from the top view, and the two supporting boards are set within the recess portions from the top view.

9. The aircraft seat assembly as claimed in claim 8, wherein an end of the two supporting boards and a side of the two supporting boards near the arm body are pivotally set within the recess portion, and the side of the two supporting boards is near a seat cushion of the aircraft seat.

10. The aircraft seat assembly as claimed in claim 9, wherein the two supporting boards are turned to the seat cushion of the aircraft seat, so that the two supporting boards are rotated from the first position into the second position.

11. The aircraft seat assembly as claimed in claim 8, wherein the width of the two supporting boards is less than the width of the arm body, an end of the two supporting boards and a side of the two supporting boards near the arm body are pivotally set within the recess portion, and the side of the two supporting boards is opposite to a seat cushion of the aircraft seat.

12. The aircraft seat assembly as claimed in claim 11, wherein the two supporting boards are rotated corresponding to the seat cushion of the aircraft seat, so that the two supporting boards are rotated from the first position into the second position.

13. The aircraft seat assembly as claimed in claim 8, wherein an end of the two supporting boards and a side of the two supporting boards near the arm body are pivotally set within the recess portion, and the side of the two supporting boards is opposite to a seat cushion of the aircraft seat.

14. The aircraft seat assembly as claimed in claim 13, wherein the two supporting boards are rotated forward to the seat cushion of the aircraft seat, so that the two supporting boards are rotated from the first position into the second position, where the two supporting boards and the arm body are integrated in a reverse T-shape.

* * * * *